US012512625B2

(12) United States Patent
Decrock et al.

(10) Patent No.: US 12,512,625 B2
(45) Date of Patent: Dec. 30, 2025

(54) IMPEDANCE MATCHING STRUCTURE FOR A HIGH-SPEED CONNECTOR AND CONNECTOR

(71) Applicants: TE Connectivity Solutions GmbH, Schaffhausen (CH); TE Connectivity Belgium BV, Oostkamp (BE); Tyco Electronics Holdings (Bermuda) No. 7 Limited, Hamilton (BM)

(72) Inventors: Lieven Decrock, Oostkamp (BE); Michael Rosier, Middletown, PA (US); Josh Jiang, Taipei (TW)

(73) Assignees: TE Connectivity Solutions GmbH, Schaffhausen (CH); TE Connectivity Belgium BV, Hamilton (BM); Tyco Electronics Holdings (Bermuda) No. 7 Limited, Oostkamp (BE)

( * ) Notice: Subject to any disclaimer, the term of this patent is extended or adjusted under 35 U.S.C. 154(b) by 446 days.

(21) Appl. No.: 18/188,865

(22) Filed: Mar. 23, 2023

(65) Prior Publication Data

US 2023/0307876 A1 Sep. 28, 2023

(30) Foreign Application Priority Data

Mar. 23, 2022 (EP) .................................... 22163914

(51) Int. Cl.

| | |
|---|---|
| ***H01R 13/00*** | (2006.01) |
| ***H01R 13/24*** | (2006.01) |
| ***H01R 13/6473*** | (2011.01) |

(52) U.S. Cl.

CPC ..... *H01R 13/6473* (2013.01); *H01R 13/2407* (2013.01)

(58) Field of Classification Search

CPC ........................ H01R 13/6473; H01R 13/2407

See application file for complete search history.

(56) References Cited

U.S. PATENT DOCUMENTS 4,874,319 A * 10/1989 Hasircoglu .......... H01R 13/658 439/607.07
4,898,546 A * 2/1990 Elco .................... H01R 12/724 439/607.11

(Continued)

FOREIGN PATENT DOCUMENTS

CN 106571567 B 4/2017
JP 2003257559 A 9/2003

(Continued)

OTHER PUBLICATIONS

Extended European Search Report from the European Patent Office dated Sep. 12, 2022, corresponding to Application No. 22163914.9-1201, 55 pages.

*Primary Examiner* — Phuong Chi Thi Nguyen
(74) *Attorney, Agent, or Firm* — Barley Snyder

(57) ABSTRACT

An impedance matching structure for a high-speed connector includes a pair of ground leads, a differential pair of signal leads, a ground plane, a first region in which the ground leads and the differential pair of signal leads are coplanar within a first plane, and a second region in which the differential pair of signal leads lies on the first plane and the ground plane lies on a second plane extending along the first plane. The impedance matching structure has a transition region between the first region and the second region. The ground leads are connected to the ground plane in the transition region. An impedance matching projection is arranged in the transition region and projects from a side of the differential pair of signal leads.

17 Claims, 5 Drawing Sheets

(56) References Cited

U.S. PATENT DOCUMENTS

| | | | | | |
|---|---|---|---|---|---|
| 5,141,445 | A * | 8/1992 | Little | H01R 12/57 | |
| | | | | 439/607.07 | |
| 5,169,325 | A * | 12/1992 | Yaegashi | H01R 13/6585 | |
| | | | | 439/607.07 | |
| 7,535,316 | B2 | 5/2009 | Tanbakuchi et al. | | |
| 10,403,565 | B1 | 9/2019 | Henry | | |
| 11,381,038 | B1 * | 7/2022 | Patel | H01R 13/65914 | |
| 11,715,911 | B2 * | 8/2023 | Tryson | H01R 13/6597 | |
| | | | | 439/108 | |
| 11,735,846 | B2 * | 8/2023 | Phillips | H01R 12/721 | |
| | | | | 439/631 | |
| 2020/0375025 | A1 | 11/2020 | Kim et al. | | |
| 2023/0307876 | A1 * | 9/2023 | Decrock | H01R 13/6473 | |

FOREIGN PATENT DOCUMENTS

| | | | |
|---|---|---|---|
| JP | 2019192601 | A | 10/2019 |
| WO | 8707444 | A1 | 12/1987 |
| WO | 2011090634 | A2 | 7/2011 |

* cited by examiner

IMPEDANCE MATCHING STRUCTURE FOR A HIGH-SPEED CONNECTOR AND CONNECTOR

CROSS-REFERENCE TO RELATED APPLICATIONS

This application claims the benefit of the filing date under 35 U.S.C. § 119(a)-(d) of European Patent Application No. 22163914.9, filed on Mar. 23, 2022.

FIELD OF THE INVENTION

The present disclosure relates to an impedance matching structure for a high-speed connector and to the corresponding connector.

BACKGROUND

The electronics, automotive, communication, and networking industry are continuously evolving with innovations in product offerings to support high-speed data transfer. The demand is rising for a compact and flexible connector design, which offers enhanced connectivity, reliability, and high-speed transfer. Advancement in the connector improves the device performance as well as reduces the space consumption.

As a result, the market players are focusing on developing faster, smaller, and more efficient high-speed connectors. High-speed connectors need to perform fast data transfer and ensure a high clarity of the transmitted data. The connectors have a small power usage while at the same time enabling a high performance. A potential application for such a high-speed connector is the server market, where transfer rates up to 112 Gbit/s are planned and even higher speeds are expected in future.

One consideration in optimizing high-speed data transmission is signal degradation, which involves crosstalk and signal reflection, and the other is impedance. Crosstalk and signal reflection may be controlled by shielding the cables and using a differential pair of signal wires.

During the development, simple DC connections became transmission lines where impedance control was essential. As the difference between the signal levels of a one and a zero became smaller, induced noise threatened to corrupt the data. The industry moved from single-ended signaling to differential signaling where the difference in voltage levels between two conductors cancelled external interference.

In order to maximize the power transfer and minimize the signal reflections, it is desirable to obtain a substantially constant impedance throughout the transmission line and to avoid large discontinuities in the impedance of the transmission line. It is well known that throughout the connector the impedance typically changes. Although it is comparably easy to maintain a desired impedance through a transmission line, an impedance change is usually encountered in the area where the geometry or physical arrangement of the conductor is changed.

Inside a connector however, the transmission line may be bent, have a changed structure, or is connected to another component. Every transition between different arrangements is prone to impedance discontinuities. If this impedance is deviating from the nominal impedance, it affects the integrity of the signals transmitted across the transmission path.

An impedance mismatch in a transmission path can cause signal reflections, which leads to effects such as signal loss and cancellation. It is therefore desirable to tune the impedance at the transition area to reduce the discontinuities.

It is known that controlling the timing skew can introduce an impedance mismatch. This timing skew results from a different bending of two corresponding transmission lines lying coplanar on a printed circuit board (PCB). To remove the timing skew small bends, top-hat structures are introduced to one of the transmission lines. However, these top-hat structures lead to the impedance mismatch between the signal lines.

Current implementations mainly focus on tuning the impedance of conductors in one plane. The transmission lines lie coplanar within e.g. a PCB. However, when transferring from this structure into a 3-dimensional stripline structure, also impedance discontinuities occur, which are becoming more important because of the higher data rates. There is therefore a need for providing an improved impedance compensation to overcome the above-mentioned challenges of high-speed connectors.

SUMMARY

An impedance matching structure for a high-speed connector includes a pair of ground leads, a differential pair of signal leads, a ground plane, a first region in which the ground leads and the differential pair of signal leads are coplanar within a first plane, and a second region in which the differential pair of signal leads lies on the first plane and the ground plane lies on a second plane extending along the first plane. The impedance matching structure has a transition region between the first region and the second region. The ground leads are connected to the ground plane in the transition region. An impedance matching projection is arranged in the transition region and projects from a side of the differential pair of signal leads.

BRIEF DESCRIPTION OF THE DRAWINGS

Exemplary embodiments of the invention are described by way of the following drawings. In the drawings.

DETAILED DESCRIPTION OF THE EMBODIMENT(S)

The present disclosure is explained in greater detail using the examples depicted in the figures. Identical parts are hereby provided with identical reference numbers and identical component names. Furthermore, some features or combinations of features from the various examples shown and described may also represent independent solutions, inventive solutions, or solutions according to the disclosure.

Figure 1:
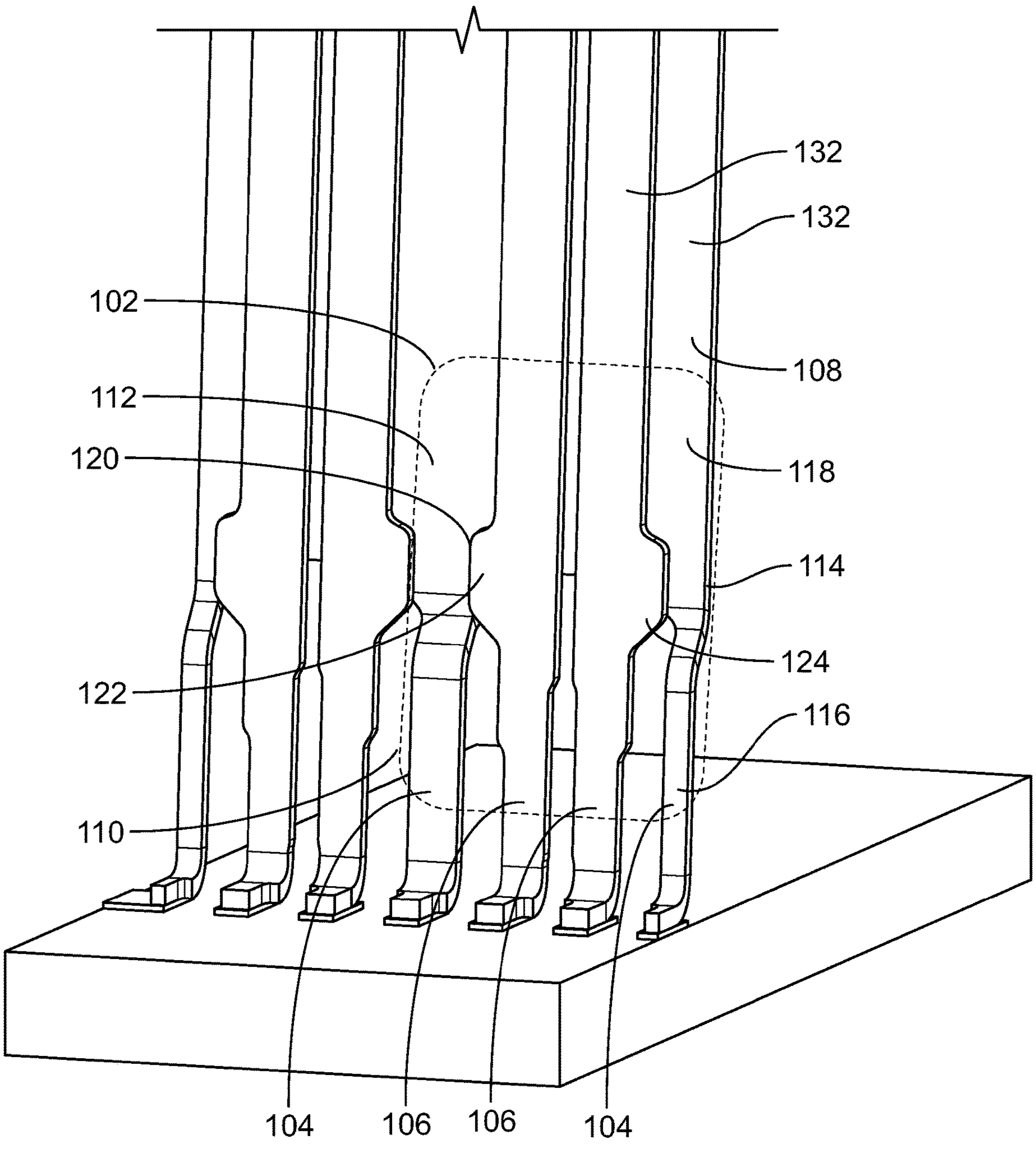
FIG. 1 is a detail perspective view of an impedance matching structure according to an embodiment.

FIG. 1 shows an arrangement of a plurality of electrically conductive leads 132 comprising an impedance matching structure 102. The impedance matching structure 102 for a high-speed connector as shown in FIG. 1 is marked with a dotted box. The structure 102 comprises a differential pair of signal leads 106 and two ground leads 104. Further, the impedance matching structure 102 comprises three regions with different positions of the leads 104, 106 with respect to each other.

In a first region 110, the two ground leads 104 and the differential pair of signal leads 106 are coplanar within a first plane 116. In this case, both signal leads 106 of the differential pair are arranged next to each other and next to them one ground lead 104 on each side. Moreover, the distance between two leads 104, 106 may be always the same. This arrangement is chosen to increase the shielding and to reduce undesired effects such as crosstalk. However, it would also be possible to arrange the leads 104, 106 differently and to vary the distances between the leads in order to increase the distance to a neighboring signal pair.

In a second region 112, the differential pair of signal leads 106 lies on the first plane 116 and a ground plane 108 lies on a second plane 118, which extends along the first plane 116. The ground plane 108 is connected to the two ground leads 104 in a transition region 114. The transition region 114 is arranged between the first region 110 and the second region 112. The transition region 114 denotes the region in which the two ground leads 104 and the differential pair of signal leads 106 change between the first region 110 and the second region 106. Hence, this region 114 connects the first region 110 and the second region 112 and a transition between the different arrangements takes place. Additionally, in the transition region 114, one impedance matching projection 120 is arranged and projects from at least one side of the differential pair of signal leads 106.

The impedance matching projection 120 in the Figures has a first impedance matching element 122 and a second impedance matching element 124 with one extending from each signal lead 106. In an embodiment, the first and second impedance matching element 122, 124 are arranged symmetrically to each other on opposite sides of both signal leads 106 of the differential pair of signal leads 106. For a differential pair of signal leads 106, the symmetrical arrangement has the advantage of compensating the mismatch equally for both leads, which results in a more even impedance, and avoiding adding skew. Another option would be to offset the two elements 122, 124, in a case where the impedance is tuned differently. The impedance matching projection 120 also comprise more or less than two elements and these elements could be arranged unsymmetrically, depending on the tuning requirements of the impedance in the connector.

In the Figures, the matching projection 120 is shown as a protrusion extending from the signal leads 106. The shape of this protrusion is not limited to the examples shown in the Figures, but may have any geometrical shape. Further, in another example the impedance matching structure may be in form of a recess in one of the leads.

Figure 2:
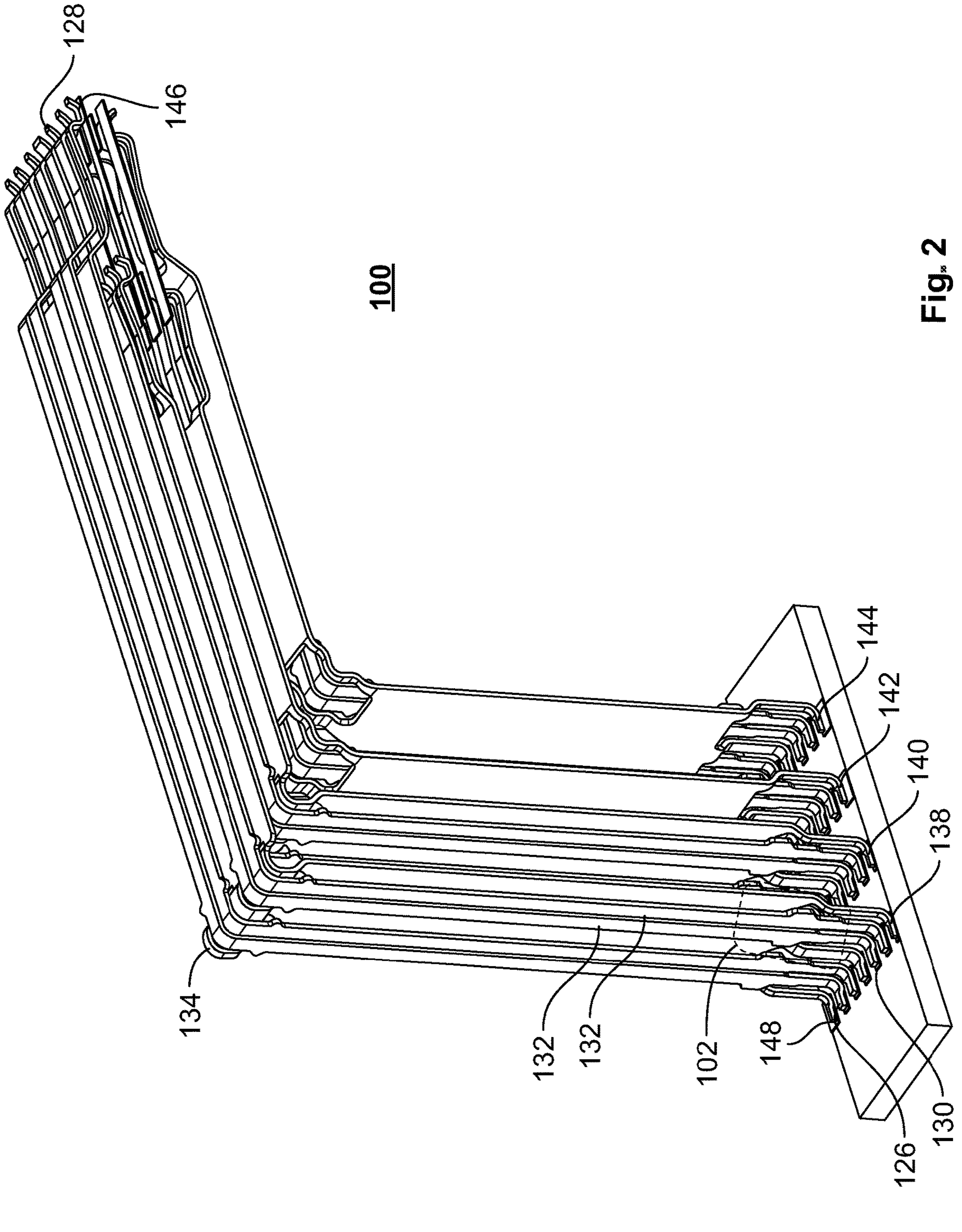
FIG. 2 is a perspective view of a plurality of electrically conductive leads with the impedance matching structure in a connector.

FIG. 2 shows an example of a connector 100. In FIG. 2, the connector 100 for a high-speed data transmission that comprises the impedance matching structure 102 (dotted box) is depicted. The connector 100 comprises one first group of contacts 126 and one second group of contacts 128. Via the first group of contacts 126, the connector 100 may be connected to a PCB, e.g. a host board that is located on a customer system. The PCB comprises electronic components such as a memory and a CPU, required for the respective application. On the other side of the connector, at the second group of contacts 128, a second PCB is located.

Both groups of contacts have four contacts 130 that are interconnected by four electrically conductive leads 132. Exemplarily, the number of contacts of one impedance matching structure 102 is chosen as four, whereby two contacts correspond to the two ground leads 104 and the other two to the differential pair of signals 106. The number of electrically conductive leads 132 of the impedance matching structure 102 can differ, and the number of contacts can also differ.

Electrically conductive leads 132 are the signal leads 106, the ground leads 104 and the ground plane 108. At the electrically conductive leads 132, one impedance matching structure 102 is arranged. Those leads 132 may be fabricated from stamped and bent metal such that they can be arranged in a space-saving manner. This provides a robust but flexible lead, which can be produced cost efficiently in a high number.

As can be seen in FIG. 2, the first group of contacts 126 is arranged in a linear conductor row with L-shaped soldered terminals 148. In particular, the terminals 148 are arranged adjacent to each other. At the second group of contacts 126, the electrically conductive leads 132 are contacted to the second PCB via spring contacts 146. The spring contacts 146 enable a solderless connection, which is tolerant to vibrations. However, the different contacts at both group of contacts could also be switched, or the same method is applied for both groups. Further, both groups of contacts may be contacted completely different. Any common connecting method is applicable here.

On the host board connector side, it is clearly visible that the connector 100 comprises multiple conductor rows. Here, exemplarily four conductor rows 138, 140, 142, 144 are depicted. The rows are arranged one after each other in planes that are parallel to the first and second plane 116, 118. It is clear that this view only shows a section of the connector 100 and that therefore any number of conductor rows 138, 140, 142, 144 is feasible. Additionally, it may also be a consideration to arrange the rows 138, 140, 142, 144 differently, if the depicted arrangement would be too space-consuming for a large number of rows.

Figure 4:
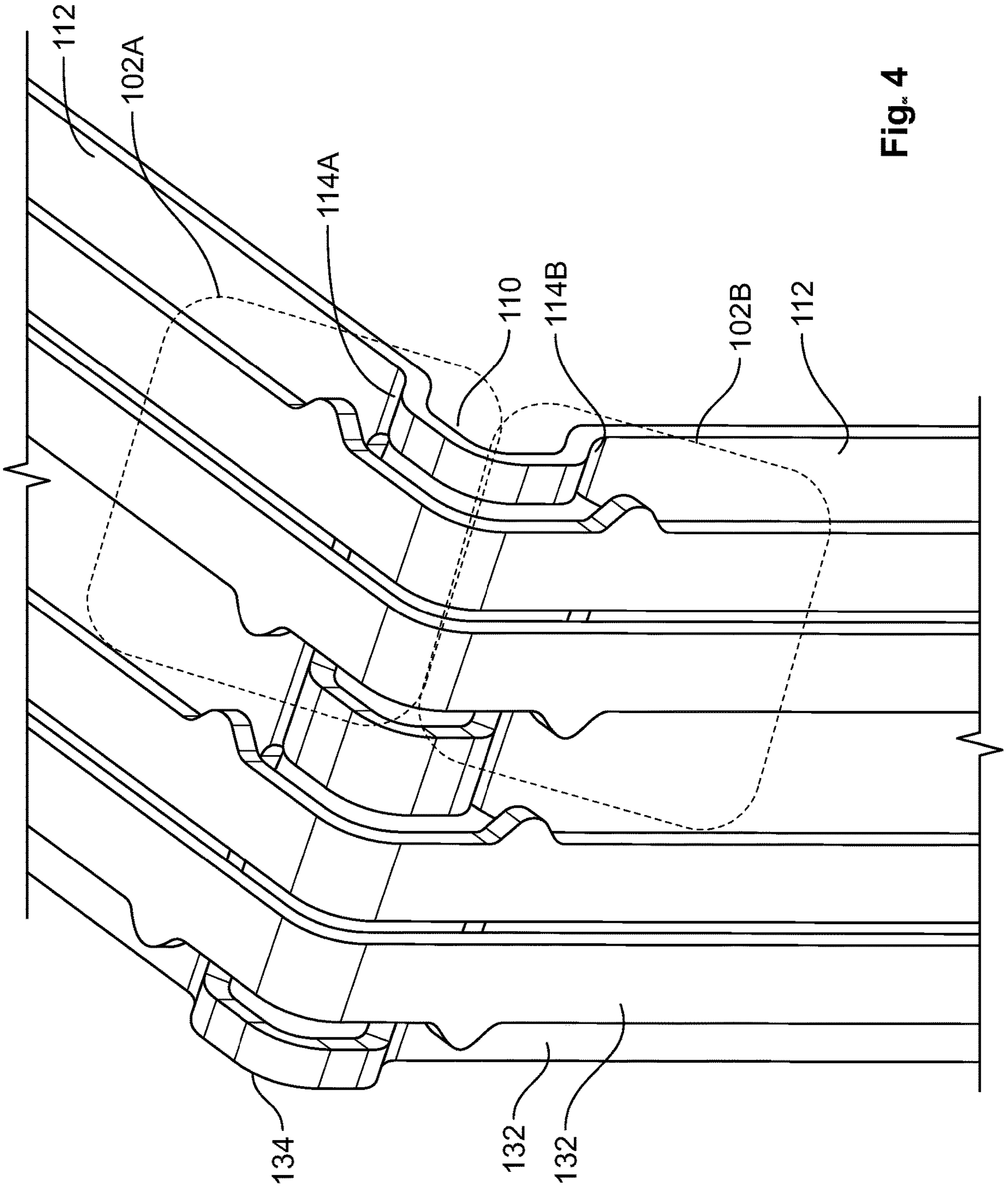
FIG. 4 is a detail view of a bending region of the connector.

The bending region 134, where the electrically conductive leads 132 change from a vertical orientation to a horizontal orientation is further explained in FIG. 4.

Figure 3:
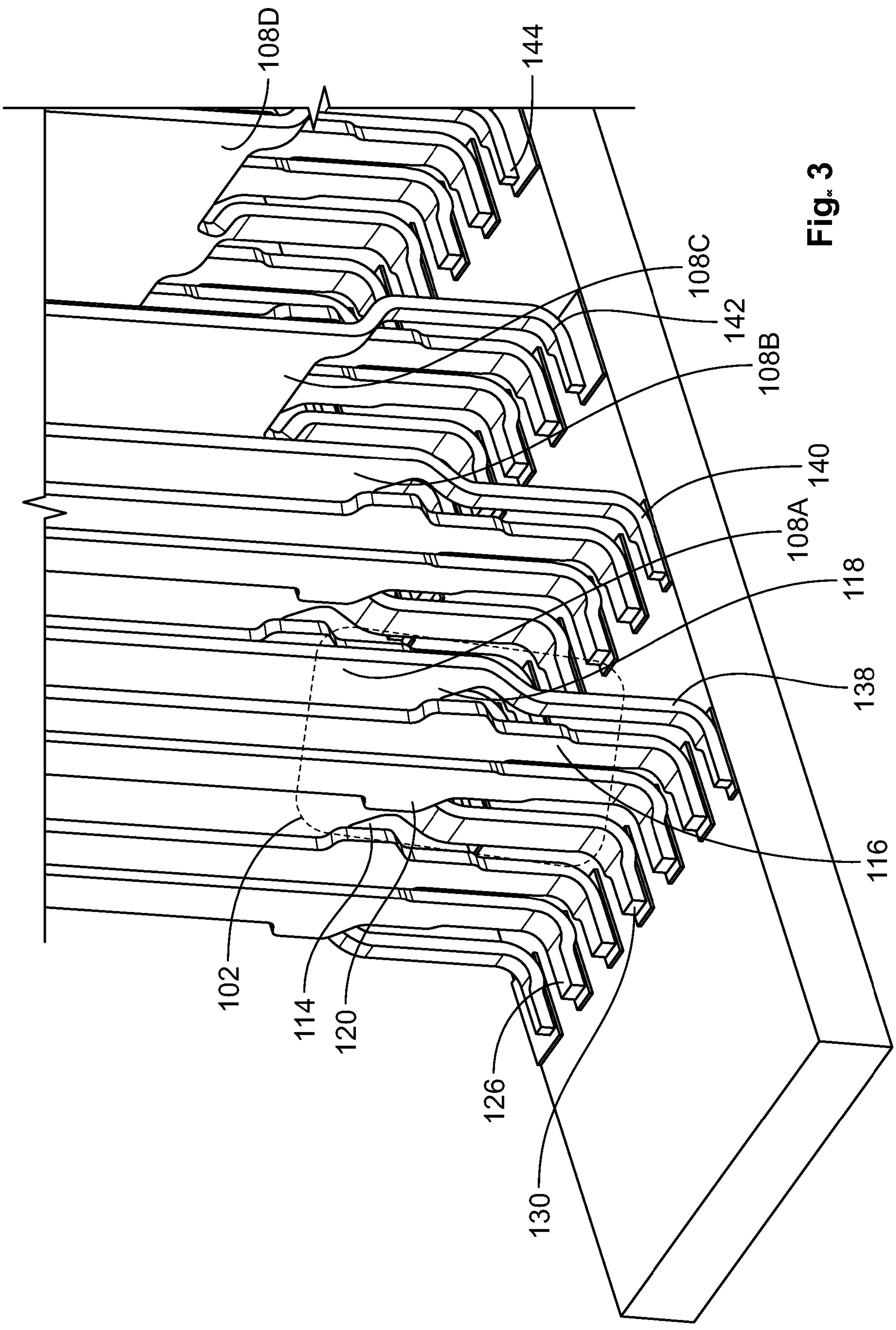
FIG. 3 is a detail perspective view of the impedance matching structure.

In FIG. 3, a further detailed view on the impedance matching structure 102 and the arrangement of the four conductor rows 138, 140, 142, 144 is shown from a rotated perspective. From this view, the transition region 114 of the impedance matching structure 102, where the differential pair of signal leads 106 and the ground leads 104 transition between the first region 110 and the second region 112 is shown clearly. The two ground leads 104 are connected to one ground plane 108, which runs behind the signal leads 106 in the second plane 118, parallel to the first plane 116. In this transition region 114, the impedance of the leads 132 changes due to the change of their arrangements. Therefore, in this area, the impedance matching projection 120 is located, which allows to tune the impedance to match accordingly and thus increase the transmission performance.

Further, FIG. 3 shows that one conductor row 138, 140, 142, 144 has at least one impedance matching structure 102, here exemplarily chosen as two with each having four contacts 130. Both impedance matching structures 102 are arranged adjacent to each other, such that the contacts 130 of the first group of contacts 126 are in one row.

In the setup where two impedance matching structures 102 are arranged next to each other, the two adjacent ground leads 104 form one ground lead, due to space-saving reasons. In other words, two adjacent ground leads 104 are combined to one ground lead. However, this is not necessary and it would also be possible to have two adjacent ground leads. The functionalities of the present disclosure however are not limited or changed if the two ground leads are not combined, but remain separately.

The exemplarily four conductor rows 138, 140, 142, 144 that are placed in parallel in the connector 100 are arranged in such a way that adjacent rows are shielded by ground planes. In particular, a ground plane 108A of the first conductor row 138 is arranged between the first conductor row 138 and the second conductor row 140 and a ground plane 108B of the second conductor row 140 is arranged between the second conductor row 140 and the third conductor row 142. For the third conductor row 142 and the fourth conductor row 144 the order changes such that a ground plane 108C of the third conductor row 142 is arranged between the second conductor row 140 and the third conductor row 142 and a ground plane 108D of the fourth conductor row 144 is arranged between the third conductor row 142 and the fourth conductor row 144. Thus, crosstalk is not only avoided in one conductor row but also between multiple conductor rows.

Again, it is clear that this is only one exemplarily arrangement of the conductor rows 138, 140, 142, 144, to increase the shielding in the middle of the rows 138, 140, 142, 144, which reduces signal disturbances. At the same time, the number of grounding planes can be reduced to a minimum without having losses in the shielding. It is obviously also possible to arrange the ground planes differently, if required. The rows could also be arranged following the scheme of the first and second conductor row, the one of the third and fourth conductor row or in a different way.

The arrangement of the conductor rows 138, 140, 142, 144 allows a very compact and small sized connector design, while at the same time reduces crosstalk or any other signal disturbance effects. It is clear the any number of conductor rows 138, 140, 142, 144 deviating from four is feasible with the connector according to the present disclosure. Additionally, also the arrangement of the conductor rows 138, 140, 142, 144 may vary depending on the space requirements and therefore deviating from being parallel to the first and second plane. It would also be possible to arrange some conductor rows 138, 140, 142, 144 perpendicular to the others.

The bending region 134 of the electrically conductive leads 132 is shown in detail in FIG. 4. The connector 100 may comprise at least one of such a bending region 134, where the leads 132 are bend and change the orientation. In particular, the bending region 134 comprises a first impedance matching structure 102A with a first transition region 114A and a second impedance matching structure 102B with a second transition region 114B.

The electrically conductive leads 132 being in a stripline structure, such that the differential pair of signal leads 106 lies on the first plane 116 and the ground plane 108 lies on the second plane 118, change from this structure to a coplanar structure and back to a stripline structure in the bending region 134. The transition from the stripline structure to the coplanar structure takes place in the second transition region 114B. There, the two ground leads 104 and the differential pair of signal leads 106 extend from the second region 112 to the first region 110. Thus, at the kink of the leads 132, the signal leads 106 and the ground leads 104 lie on one plane again, before running along the first transition region 114A. There, the leads 132 extend from the first region 110 to the second region 112 and therefore change again from the coplanar to the stripline structure. At the bending region 134, the arrangement of the differential pair of signal leads 106 and the ground leads 104 changes twice.

In both regions 114A, 114B, the impedance of the transmission leads changes and therefore must be tuned in order to increase the performance. Exemplarily, in FIG. 4 one conductor row comprises two adjacent impedance matching structures 102 with each having a first and a second impedance matching structure 102A, 102B, which results in an optimal transmission performance. The symmetrical arrangement of the impedance matching structures 102 around the bending region 134 is not necessary, and is adaptable to the requirements of the signal. Further, within one conductor there could be multiple bending regions 134, or none, in case of a straight connector.

Figure 5:
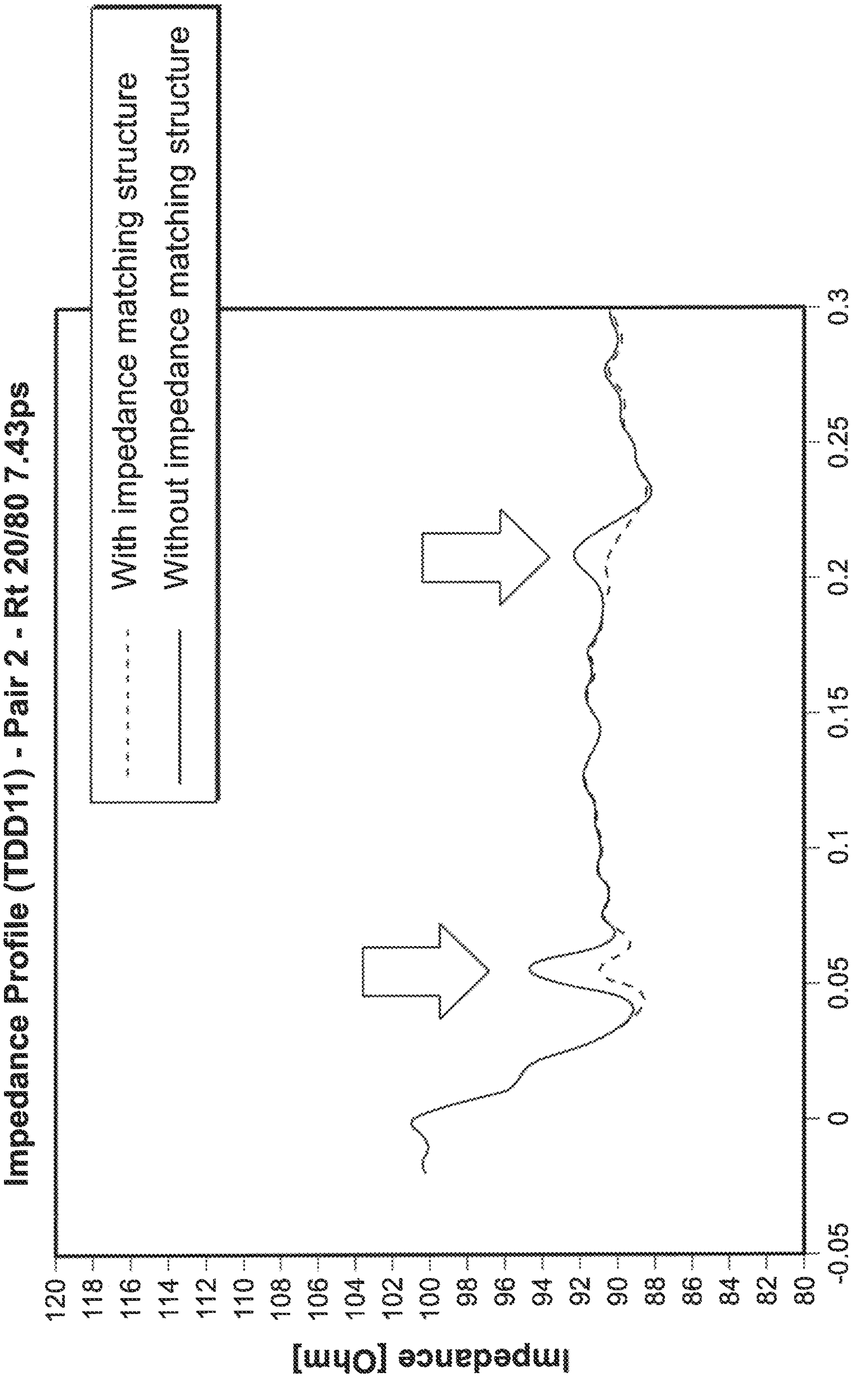
FIG. 5 is a graph of a comparison of impedance measurements with and without the impedance matching structure.

The diagram in FIG. 5 shows a simulation result of an impedance measurement over time for a conductive lead with and without the presented impedance matching structure 102. The straight line denotes the measurement without the introduced matching structure and the dotted line with matching structure. At 0.05 ns and 0.2 ns, two impedance peaks are clearly visible in the measurement line without the compensation structure. In comparison at the same time, the impedance for a measurement with compensation structure is up to 5Ω less than the measurement without compensation structure.

In summary, the present disclosure provides a design of a high-speed connector, which finds a balance between signal integrity performance such as impedance, insertion loss, crosstalk and manufacturability. To tune the impedance of the design, a new compensation structure has been introduced, which tunes the electromagnetic field and hence the impedance.

The present disclosure is based on the idea to provide an impedance compensation structure at the critical transition area between the coplanar and the stripline structure. In particular, an impedance mismatch, which appears in an area where the conductors change its arrangement, can be compensated by introducing a projection, which extends from the conductors.

Such an impedance matching projection has the advantage of reducing the impedance discontinuities arising in an area where the differential pair of signal leads and the ground leads change their arrangement to each other. Further, the shape and type of projection is adaptable to various connector types and to comparable transition regions where an impedance mismatch occurs. The matched impedance reduces the signal reflections in the connector and therefore increases the power transfer. In particular, skew variances are minimized in the connector design by designing the signal leads as a fully symmetrical structure.

What is claimed is:

1. An impedance matching structure for a high-speed connector, comprising:

a pair of ground leads;

a differential pair of signal leads;

a ground plane;

a first region in which the ground leads and the differential pair of signal leads are coplanar within a first plane;

a second region in which the differential pair of signal leads lies on the first plane and the ground plane lies on a second plane extending along the first plane;

a transition region between the first region and the second region, the ground leads are connected to the ground plane in the transition region; and an impedance matching projection arranged in the transition region and projecting from a side of the differential pair of signal leads.

2. The impedance matching structure of claim 1, wherein the impedance matching projection has a first impedance matching element and a second impedance matching element arranged asymmetrically to each other on opposite sides of the signal leads of the differential pair of signal leads.

3. The impedance matching structure of claim 1, wherein the differential pair of signal leads and the ground leads are arranged equidistantly next to each other in the first region.

4. A connector for a high-speed data transmission, comprising:

a first group of contacts;

a second group of contacts, the first group of contacts and the second group of contacts each have four contacts interconnected by at least four electrically conductive leads; and an impedance matching structure arranged at the electrically conductive leads, the impedance matching structure includes a pair of ground leads, a differential pair of signal leads, a ground plane, a first region in which the ground leads and the differential pair of signal leads are coplanar within a first plane, a second region in which the differential pair of signal leads lies on the first plane and the ground plane lies on a second plane extending along the first plane, a transition region between the first region and the second region, the ground leads are connected to the ground plane in the transition region, and an impedance matching projection arranged in the transition region and projecting from a side of the differential pair of signal leads.

5. The connector of claim 4, wherein the first group of contacts is arranged as a linear conductor row.

6. The connector of claim 4, wherein the second group of contacts is a plurality of spring contacts.

7. The connector of claim 4, wherein the electrically conductive leads are fabricated from stamped and bent metal.

8. The connector of claim 4, the impedance matching structure is one of a plurality of impedance matching structures provided adjacent to each other.

9. The connector of claim 8, wherein a pair of adjacent ground leads of the ground leads are combined to form one ground lead.

10. The connector of claim 4, wherein the connector has a first conductor row, a second conductor row, a third conductor row, and a fourth conductor row arranged next to each other in planes parallel to the first plane and the second plane.

11. The connector of claim 10, wherein a ground plane of the first conductor row is arranged between the first conductor row and the second conductor row, a ground plane of the second conductor row is arranged between the second conductor row and the third conductor row, a ground plane of the third conductor row is arranged between the second conductor row and the third conductor row, and a ground plane of the fourth conductor row is arranged between the third conductor row and the fourth conductor row.

12. The connector of claim 4, wherein the first group of contacts is a plurality of L-shaped solder terminals.

13. The connector of claim 12, wherein the L-shaped solder terminals are arranged adjacent to each other.

14. The connector of claim 4, wherein the connector has a bending region in which the electrically conductive leads are bent.

15. The connector of claim 14, wherein the impedance matching structure is one of a plurality of impedance matching structures, the bending region has a first impedance matching structure of the plurality of impedance matching structures and a second impedance matching structure of the plurality of impedance matching structures.

16. The connector of claim 15, wherein the transition region of the first impedance matching structure is a first transition region, the ground leads and the differential pair of signal leads in the first transition region extend from the first region to the second region.

17. The connector of claim 16, wherein the transition region of the second impedance matching structure is a second transition region, the ground leads and the differential pair of signal leads in the second transition region extend from the second region to the first region.

* * * * *